United States Patent
Flood

(12) 
(10) Patent No.: US 6,415,026 B1
(45) Date of Patent: Jul. 2, 2002

(54) METHOD OF AND SYSTEM FOR ENHANCED CALL WAITING IN A TELECOMMUNICATIONS NETWORK

(75) Inventor: Robert James Shores Flood, Allen, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 08/947,357

(22) Filed: Oct. 8, 1997

(51) Int. Cl.$^7$ ............................................. H04M 3/42
(52) U.S. Cl. ........................... 379/215.01; 379/201.01; 379/207.02; 379/207.03
(58) Field of Search .......................... 379/88.12, 88.19, 379/88.21, 93.03, 93.23, 93.35, 208.01, 215.01, 201, 207.02, 207.03, 207.11

(56) References Cited

U.S. PATENT DOCUMENTS

| | | | |
|---|---|---|---|
| 5,774,531 A | * 6/1998 | Johnson | 379/112.01 |
| 5,825,867 A | * 10/1998 | Epler et al. | 379/215 |
| 5,848,142 A | * 12/1998 | Yaker | 379/215 |
| 6,005,870 A | * 12/1999 | Leung et al. | 370/466 |

* cited by examiner

Primary Examiner—Ahmad F. Matar
Assistant Examiner—Bing Bui

(57) ABSTRACT

A method of and system for enhanced call waiting in a telecommunications network in which the handling of an incoming call is based on a set of user preferences. When a request for completing an incoming telephone call to a destination number is received, the system determines whether the destination number is busy. If the destination number is not busy, the system completes the telephone call to the destination number. If, however, the destination number is busy, the system determines whether the incoming telephone call corresponds to several parameters contained in one or more sets of user preferences. These parameters may include: whether the set is activated; the source of the incoming call; and the date and time of the incoming call. If the incoming telephone call does not correspond to any of these parameters, the incoming telephone call is handled with call waiting. If, however, the incoming telephone call corresponds to any of these parameters, the set of user preferences that best corresponds to the incoming telephone call is selected. The system then determines whether the incoming telephone call, based on one or more instructions in the selected set of user preferences, is to be handled with call waiting or is to be transferred. The instructions may include: how to handle the incoming call, such as priority, proximity or transfer; whether a specified tone is to be used when the incoming call is handled with call waiting; and whether a message is to be played to the incoming caller before the incoming call is transferred to a message center. Based on these instructions the incoming call will be handled with call waiting or transferred to a message center.

22 Claims, 7 Drawing Sheets

Call Waiting Preference Table ("CWPT")

| Set Identifier (12) | Row Activation Status (14) | Source of the Incoming Call (16) | Date/Time Validity Period (18) | Action to Perform (20) | Tone Override (22) | Outgoing Message Override (24) | Pass Code (26) |
|---|---|---|---|---|---|---|---|
| • • • Digit(s) identifying each CWPT row • • • | • • • Flag indicating whether the CWPT row has been activated • • • | • • • phone no. wildcard, local, metro, long distance, combination, etc. • • • | • • • Date/Time constraints for which the CWPT row is to be used • • • | • • • Priority, Proximity, or Transfer • • • | • • • 0 (none) or some value • • • | • • • 0 (none) or some value • • • | • • • 0 (none) or the pass code digit(s) • • • |

10, 28

Call Waiting Preference Table ("CWPT")

| Set Identifier | Row Activation Status | Source of the Incoming Call | Date/Time Validity Period | Action to Perform | Tone Override | Outgoing Message Override | Pass Code |
|---|---|---|---|---|---|---|---|
| 12 | 14 | 16 | 18 | 20 | 22 | 24 | 26 |
| . . . | . . . | . . . | . . . | . . . | . . . | . . . | . . . |
| Digit(s) identifing each CWPT row | Flag indicating whether the CWPT row has been activated | phone no. wildcard, local, metro, long distance, combination, etc. | Date/Time constraints for which the CWPT row is to be used | Priority, Proximity, or Transfer | 0 (none) or some value | 0 (none) or some value | 0 (none) or the pass code digit(s) |
| . . . | . . . | . . . | . . . | . . . | . . . | . . . | . . . |

FIG. 1

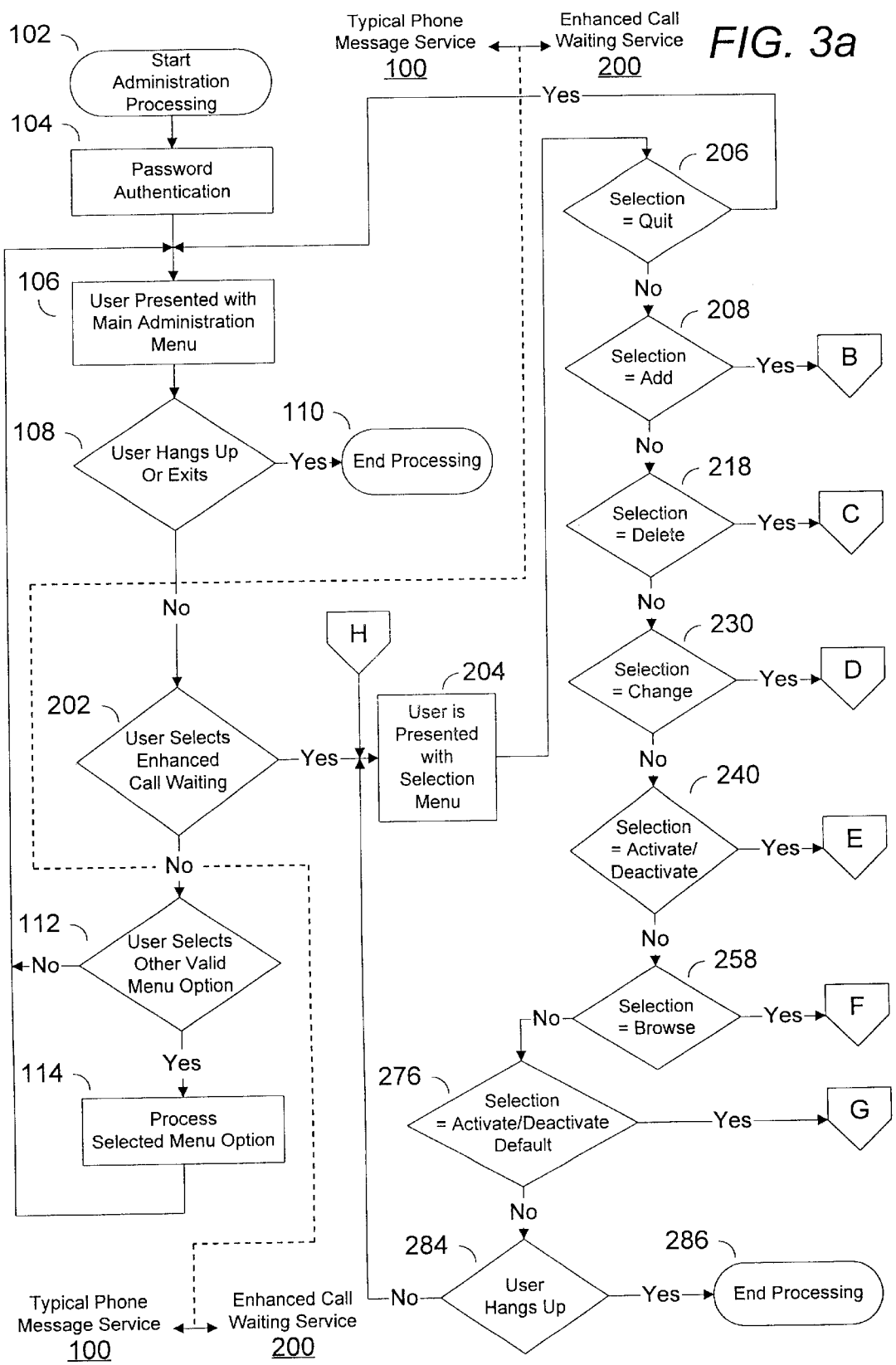

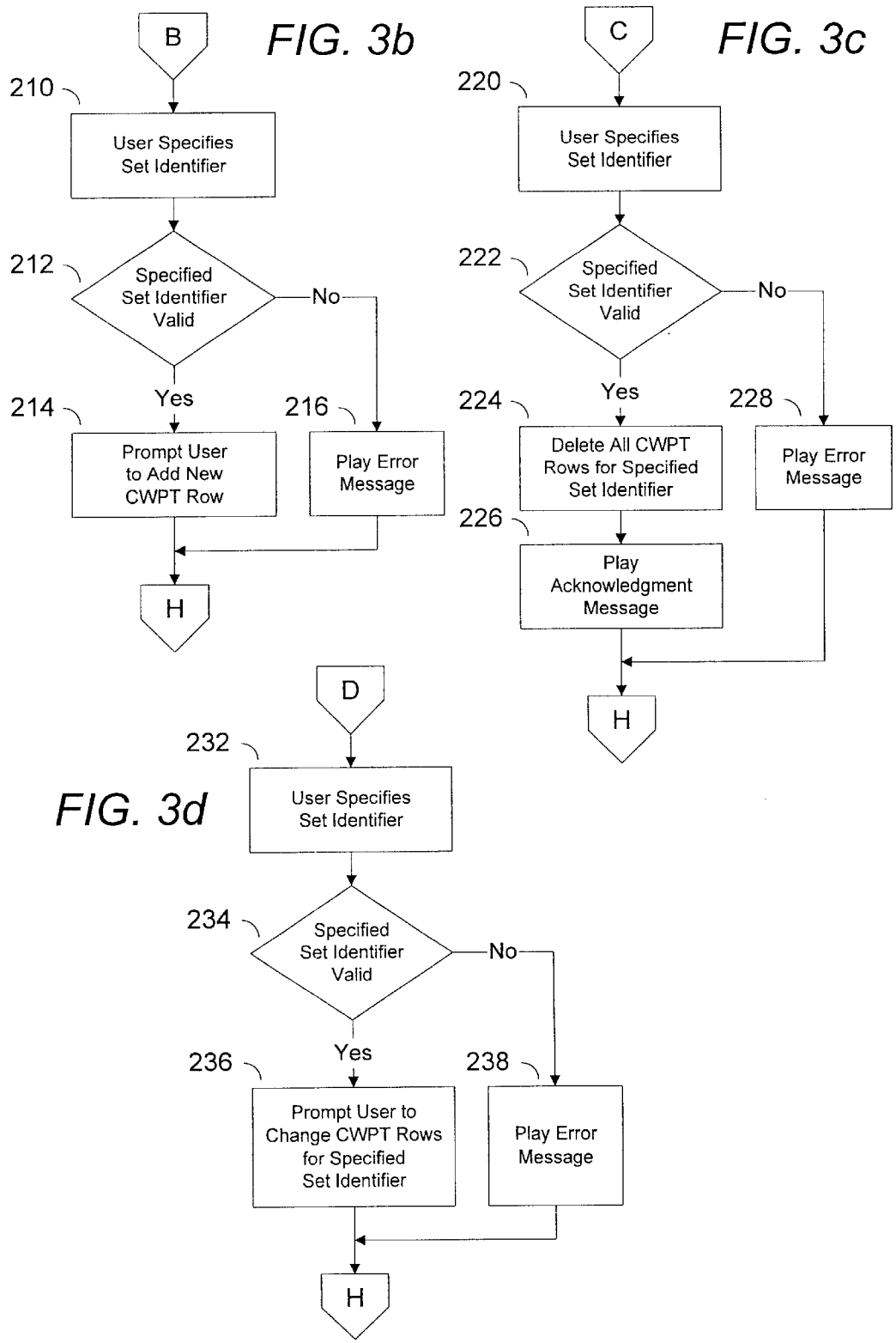

METHOD OF AND SYSTEM FOR ENHANCED CALL WAITING IN A TELECOMMUNICATIONS NETWORK

FIELD OF THE INVENTION

The present invention relates generally to call handling in a telecommunications system and more particularly to a method of and system for enhanced call waiting in a telecommunications network in which the handling of an incoming call is based on a set of user preferences.

DESCRIPTION OF THE PRIOR ART

Private telephone systems and local telephone companies currently provide services that allow a user to be notified of an incoming call while the user is engaged in another call. Generally this notification is accomplished by a special tone that alerts the user when there is an incoming call waiting for the user. When the user hears the special tone, the user can receive the incoming call by pressing and releasing the switch hook. Pressing and releasing the switch hook puts the first call effectively on hold and connects the user to the incoming call. The caller can toggle back and forth between the original call and the incoming call by pressing and releasing the switch hook.

Currently, there is no system by which the user can determine the source of the incoming call and determine whether or not the user wants to receive that call. The user must decide to either ignore the incoming call or receive the call without knowing who the caller is. Many times a user will be on a long distance call and choose not to receive the incoming call even though it may be an emergency or a call that the user is waiting for. If the user does decide to take the call, then the long distance call is put on hold while long distance charges continue to accrue. It is therefore an object of the present invention to provide a system for handling incoming calls based on a set of user preferences.

SUMMARY OF THE INVENTION

The present invention provides a method of and a system for enhanced call waiting in a telecommunications network. Call waiting is enhanced by using a set of user defined preferences to determine how to handle incoming calls when the user is currently engaged in a telephone conversation. Whenever an incoming call request is received and the destination number is busy, the invention retrieves the user's preference data, which is stored in a call waiting preference table ("CWPT"). Many sets of user preferences can be stored in the call waiting preference table, each set of user preferences having a set identifier that corresponds to a row in the call waiting preference table. In essence, each set of user preferences is an incoming call handling scheme that is used to determine how the incoming call is to be handled.

Each set of user preferences or CWPT row may include: a set identifier; a flag indicating whether the row has been activated; one or more parameters identifying sources of incoming calls for which the CWPT row is to be used; one or more parameters identifying time periods for which the CWPT row is to be used; and instructions on how to handle the incoming call. Typically, the set identifier is one or more digits used to identify the CWPT row so that the user can easily reference the user preferences it contains. Alternatively, the set identifier could correspond to one or more voice activated commands. The parameter identifying sources of incoming calls can be a specific telephone number, a telephone number containing wild cards (e.g., 214-918-* or 214-*), a classification of the incoming call (e.g., local, metro, long distance), or some combination thereof. The parameter identifying time periods can be business days and hours, personal days and hours, a day of the week, weekends, holidays, or specific days, dates and times. The instructions on how to handle the incoming call (the "action to perform") can be priority, proximity or transfer. A priority instruction indicates that the incoming call should be handled with call waiting. A proximity instruction indicates that the incoming call should be transferred to a message center when the source of the incoming call is closer than the source of the currently connected call, and the incoming call should be handled with call waiting when the source of the incoming call is not closer than the source of the currently connected call. A transfer instruction indicates that the incoming call should be transferred to a message center.

In addition, each set of user preferences or CWPT row may include other options, such as a tone override, an outgoing message override, or a pass code. The tone override specifies a tone that is to be used when the incoming call is handled with call waiting. This tone overrides the default tone that is normally used with call waiting. A user can identify the type of incoming call or even the incoming caller by recognizing the tone used, and then determine whether to receive the incoming call. The outgoing message override specifies a message that is to be used when the incoming call is transferred to a message center. This message can supplement or replace the normal message used by the message center and can be customized to fit a specific type of incoming call. The user can also specify a pass code and give that code to certain callers, such as family or friends, so that the incoming caller can override the normal handling of the incoming call. Typically, the pass code would be used by the incoming caller to indicate an emergency call.

The present invention determines how to handle the incoming call based on three parameters: the CWPT rows that have been activated; the source of the incoming call; and the date and time of the incoming call. The present invention retrieves all the CWPT rows that satisfy these three parameters and then selects the CWPT row that best matches the incoming call. The incoming call is then handled according to the instructions contained in the selected CWPT row: the action to perform (e.g., priority, proximity or transfer); the tone override, if present; the outgoing message override, if present; and the pass code, if present.

For example, if a pass code is defined in the selected CWPT row, the incoming caller is prompted for a password. If the password entered by the incoming caller matches the pass code in the selected CWPT row, the incoming call is handled with call waiting using a special tone, which indicates that this is an emergency call or the incoming caller has correctly entered the password. If on the other hand, the password entered does not match the pass code, or a pass code is not defined in the selected CWPT row, the incoming call will be handled as instructed by the action to perform. The action to be perform may be priority, proximity or transfer.

If the selected CWPT row action to perform is priority, the incoming call is handled with call waiting. As previously described, different call waiting tones can be used if a tone override is present in the selected CWPT row. If the action to perform is proximity, the source of the incoming call is compared with the source of the currently connected call. If the incoming call is closer than the currently connected call, the incoming call is transferred to the message center and the message is handled normally. As previously described, if an outgoing message override is present in the selected CWPT row, an outgoing message is played to the caller, such as "I am currently on the phone and am unable to take your call at the moment, please leave a message at the tone and I will return your call as soon as possible." If the incoming call is not closer than the currently connected call, the incoming call is handled like a priority call, as previously described. If the action to perform is transfer or if for some reason the selected CWPT row did not contain an action to perform, the incoming call is transferred to the message center and the message is handled normally. The outgoing message override is checked as previously described.

The call waiting preference table can be accessed through a standard administration processing routine. Typically, a user will call in and enter a password, which when verified, allows the user to run the administrative processing functions. The administrative processing functions are presented to the user through a main administration menu. If the user hangs up or exits the system, the processing will end. Otherwise, the user will be provided with a number of menu options, one of which would be accessing the user's call waiting preferences. Upon selecting the enhanced call waiting menu, the user is presented with a selection menu. This selection menu allows the user to quit and return to the main administration menu, or to add, delete, change, activate/deactivate, and browse the CWPT rows. In addition, the user can browse the activated CWPT rows or activate/deactivate the default configuration. When the destination number is busy, the default configuration will handle all incoming calls with call waiting.

BRIEF DESCRIPTION OF THE DRAWINGS

FIG. 1 is a table illustrating the information contained in a call waiting preference table of the present invention;

FIGS. 3a, 3b, 3c, 3d, 3e, 3f and 3g comprise a flow chart of the preferred implementation of the administrative processing of the present invention.

DESCRIPTION OF THE PREFERRED EMBODIMENT

Figure 2A:
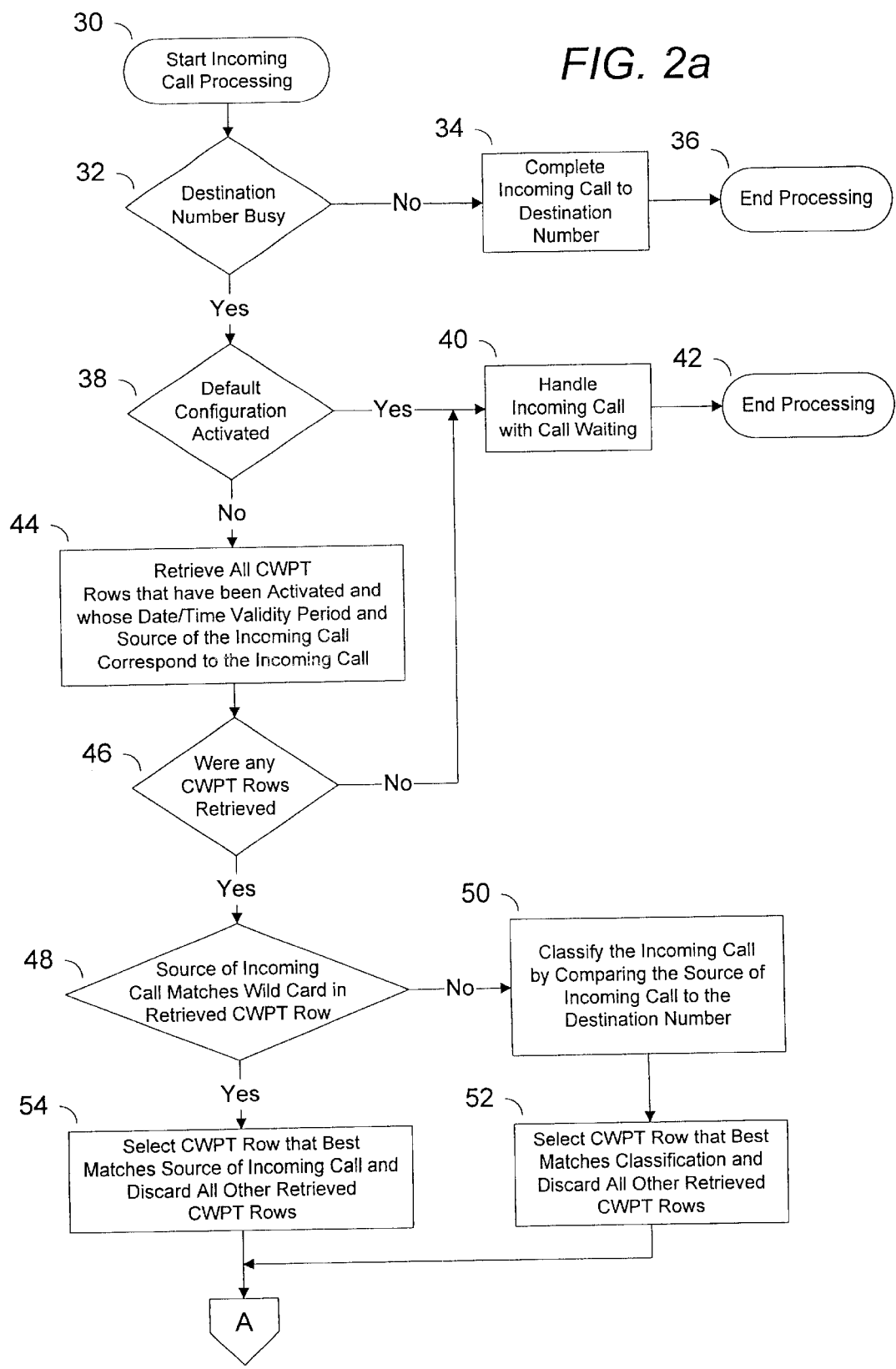
FIGS. 2a and 2b comprise a flow chart of the preferred implementation of the incoming call processing of the present invention.

Referring now to the Drawings, and first to FIG. 1, a call waiting preference table ("CWPT") is designated generally by the numeral 10. The present invention uses the call waiting preference table 10 to store the user preferences that are used to determine how to handle an incoming call. The call waiting preference table 10 includes a number of columns: set identifier 12; row activation status 14; source of the incoming call 16; date/time validity period 18; action to perform 20; tone override 22; outgoing message override 24; and pass code 26. In addition, the call waiting preference table 10 includes one or more rows 28, each CWPT row 28 representing one set of user preferences.

The first column, set identifier 12, contains one or more digits that identify each CWPT row 28. The next three columns, row activation status 14, source of the incoming call 16, and date/time validity period 18, contain parameters that determine whether the CWPT row 28 is to be selected and used to handle the incoming call. The first parameter, row activation status 14, is a flag that indicates whether the CWPT row 28 has been activated and is to be used to handle the incoming call. The second parameter, source of the incoming call 16, identifies one or more sources of incoming calls for which the CWPT row 28 is to be used to handle the incoming call. The source of the incoming call 16 can be a specific telephone number, a telephone number containing wild cards (e.g., 214-918-* or 214-*), a classification of the incoming call (e.g., local, metro, long distance), or some combination thereof. The third parameter, date/time validity period 18, identifies one or more time periods for which the CWPT row 28 is to be used to handle the incoming call. The date/time validity period 18 can be business days and hours, personal days and hours, a day of the week, weekends, holidays, or specific days, dates and times.

The next three columns, action to perform 20, tone override 22, and outgoing message override 24, contain instructions that determine how the incoming call is to be handled when the CWPT row 28 has been selected. The first instruction, action to perform 20, indicates how the incoming call will be handled, whether it is to be considered a priority, proximity, or a transfer call. The incoming call will be handled with call waiting when the action to perform 20 is priority. The incoming call will be transferred to a message center when the action to perform 20 is proximity and the source of the incoming call is closer than the source of the currently connected call. The incoming call will be handled with call waiting when the action to perform 20 is proximity and the source of the incoming call is not closer than the source of the currently connected call. The incoming call should be transferred to a message center when the action to perform 20 is transfer. The second instruction, tone override 22, is optional and specifies a value that is keyed to a specified tone, which is to be used when the incoming call is handled with call waiting. A tone override 22 equal to zero indicates that the default tone is to be used when the incoming call is handled with call waiting. The specified tone overrides the default tone that is normally used with call waiting. A user can identify the type of incoming call or even the incoming caller by recognizing the tone used, and then determine whether to receive the incoming call. The third instruction, outgoing message override 24, is optional and specifies a value that is keyed to a message, which is to be used when the incoming call is transferred to a message center. An outgoing message override 24 equal to zero indicates that no outgoing message is to be used when the incoming call is transferred. Such a message may tell the incoming caller that the user is currently on the phone and is unable to take their call and direct them to leave a message with the message center. This message can supplement or replace the normal message used by the message center and can be customized to fit a specific type of incoming call.

The last column, pass code 26, also determines how the incoming call is to be handled when the CWPT row 28 has been selected. The pass code 26 is optional and contains one or more digits that allows the incoming caller, after correctly entering a password that matches the pass code 26, to override the user preferences in the selected CWPT row 28. A pass code 26 equal to zero indicates that no pass code is allowed. Typically, the pass code 26 is given to family members or other important persons to which the user wants to give the opportunity to interrupt the current connected call. The call waiting preference table 10 of the present invention is not restricted to the specific columns identified above.

The incoming call processing features of the present invention will now be discussed by referring to FIG. 2a and 2b. Referring specifically to FIG. 2a, the present invention starts the incoming call processing in block 30 in response to receiving a request to complete an incoming telephone call to a destination telephone number. The present invention determines whether the destination number is busy in decision block 32. If the destination number is not busy, the incoming call is completed to the destination number in block 34 and call processing of the present invention ends in block 36. If on the other hand, the destination number is busy, as determined in decision block 32, the present invention determines whether a default configuration has been activated in decision block 38. If the default configuration has been activated, the incoming call is handled with call waiting in block 40 and call processing of the present invention ends in block 42.

If on the other hand, the default configuration has not been activated, as determined in decision block 38, the present invention retrieves all CWPT rows 28 (FIG. 1) having parameters that correspond to the incoming call in block 44. Specifically, only CWPT rows 28 (FIG. 1) that have been activated, row activation status 14 (FIG. 1), and whose source of the incoming call 16 (FIG. 1) and date/time validity periods 18 (FIG. 1) correspond to the incoming call are retrieved in block. The present invention then determines whether any CWPT rows 28 (FIG. 1) were retrieved in decision block 46. If no CWPT rows 28 (FIG. 1) were retrieved, the incoming call is handled with call waiting in block 40 and call processing of the present invention ends in block 42. If, however, one or more CWPT rows 28 (FIG. 1) were retrieved, as determined in decision block 46, the source of the incoming call is compared with any specific telephone numbers or telephone numbers containing wild cards (collectively referred to as "wild cards"), if any, in the source of the incoming call 16 (FIG. 1) of the retrieved CWPT rows 28 (FIG. 1) in decision block 48. If the source of the incoming call does not match any of the wild cards, as determined in decision block 48, the incoming call is classified, e.g., local, metro, long distance, etc., by comparing the source of incoming call to the destination number in block 50. Based on this classification, a CWPT row 28 (FIG. 1) is selected that best matches the incoming call classification and all other CWPT rows (FIG. 1) are discarded in block 52. If on the other hand, the source of the incoming call matches any of the wild cards, as determined in decision block 48, the CWPT row 28 (FIG. 1) that best matches the source of the incoming call is selected and all other CWPT rows 28 (FIG. 1) are discarded in block 54.

Figure 2B:
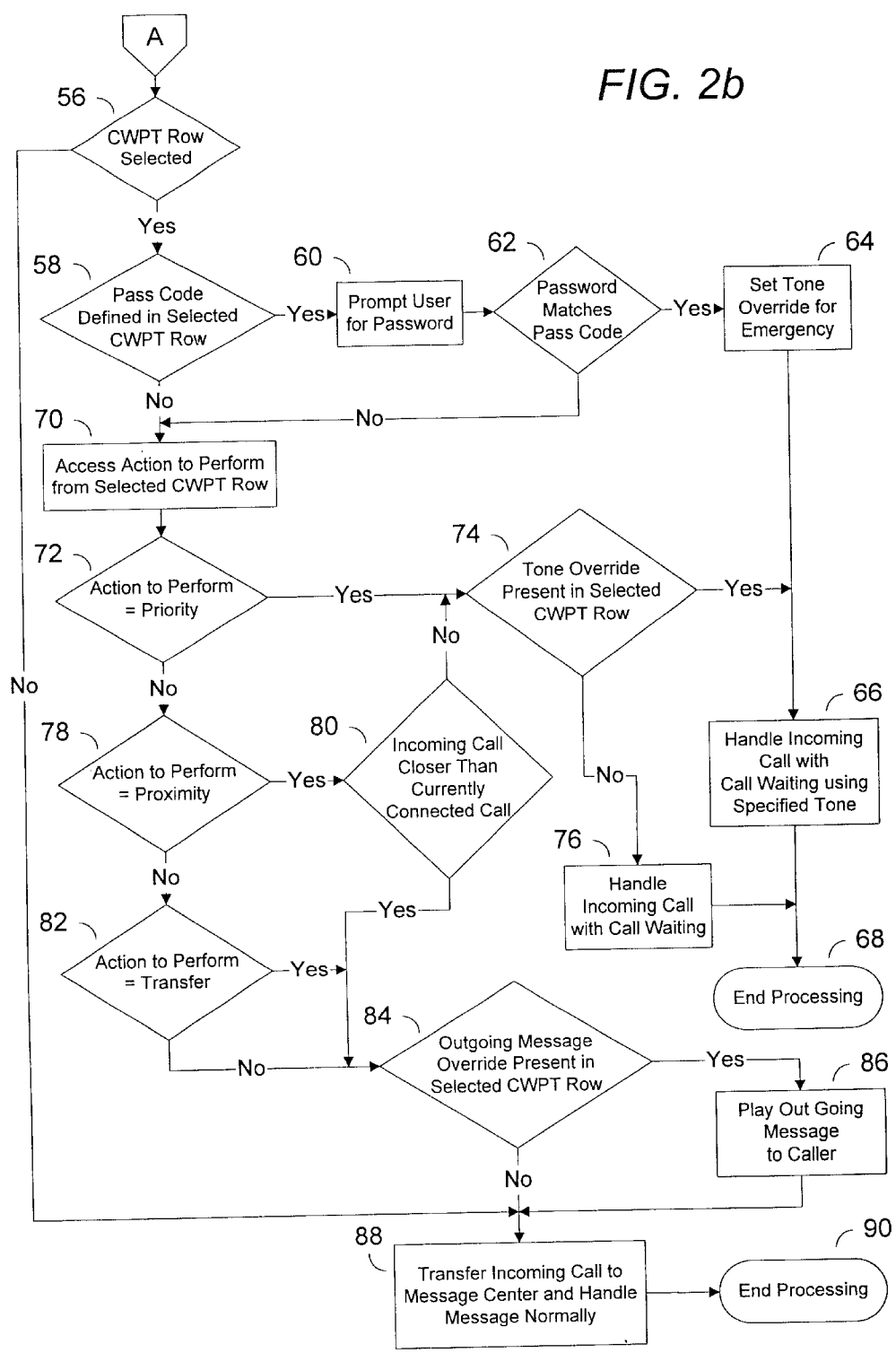

Now referring specifically to FIG. 2b, after the completion of block 52 or 54 (FIG. 2a), the invention determines whether a CWPT row 28 (FIG. 1) has been selected in decision block 56. If a CWPT row 28 (FIG. 1) has not been selected, the incoming call is transferred to a message center and the message is handled normally in block 88, and call processing of the present invention ends in block 90. If a CWPT row 28 (FIG. 1) has been selected, as determined in decision block 56, the present invention determines whether a pass code 26 (FIG. 1) is defined in the selected CWPT row 28 (FIG. 1) in decision block 58. If a pass code 26 (FIG. 1) is defined, an interface is activated with the incoming caller to accept a password in block 60. The present invention then compares the password entered by the incoming caller with the pass code 26 (FIG. 1) defined in the selected CWPT row 28 (FIG. 1) in decision block 62. If the password entered by the incoming caller matches the pass code 26 (FIG. 1), the present invention will set the tone override to indicate an emergency in block 64, handle the incoming call with call waiting using the specified tone in block 66, and call processing of the present invention ends in block 68. If on the other hand, a pass code 26 (FIG. 1) is not defined in the selected CWPT row 28 (FIG. 1), as determined in decision block 58, or the password entered by the incoming caller does not match, as determined in decision block 62, the present invention accesses the action to perform 20 (FIG. 1) from the selected CWPT row 28 (FIG. 1) in block 70.

The present invention then executes the action to perform 20 (FIG. 1) from the selected CWPT row 28 (FIG. 1) through decision blocks 72, 78 and 82. At decision block 72, if the action to perform 20 (FIG. 1) is priority, the present invention determines whether a tone override 22 (FIG. 1) is present in the selected CWPT row 28 (FIG. 1) in decision block 74. If a tone override 22 (FIG. 1) is present, the incoming call is handled with call waiting using the specified tone in block 66 and call processing of the present invention ends in block 68. If the tone override 22 (FIG. 1) is not present, as determined in decision block 74, the incoming call is handled with call waiting in block 76 and call processing of the present invention ends in block 68. If at decision block 72, the action to perform 20 (FIG. 1) is not equal to priority, the present invention determines whether the action to perform 20 (FIG. 1) is equal to proximity in decision block 78.

If the action to perform 20 (FIG. 1) is equal to proximity, as determined in decision block 78, the present invention determines whether the source of the incoming call is closer than the source of the currently connected call in decision block 80. If the source of the incoming call is not closer than the source of the currently connected call, the present invention determines whether a tone override 22 (FIG. 1) is present in the selected CWPT row 28 (FIG. 1) in decision block 74. If a tone override 22 (FIG. 1) is present, the incoming call is handled with call waiting using the specified tone in block 66 and call processing of the present invention ends in block 68. If tone override 22 (FIG. 1) is not present, as determined in decision block 74, the incoming call is handled with call waiting in block 76 and call processing of the present invention ends in block 68. If the source of the incoming call is closer than the source of the currently connected call, as determined in decision block 80, the present invention determines whether an outgoing message override 24 (FIG. 1) is present in the selected CWPT row 28 (FIG. 1) in decision block 84. If no outgoing message override 24 (FIG. 1) is present, the incoming call is transferred to the message center and the message is handled normally in block 88 and call processing of the present invention ends in block 90. If, however, an outgoing message override 24 (FIG. 1) is present in the selected CWPT row 28 (FIG. 1), as determined in decision block 84, the outgoing message is played to the incoming caller in block 86, the incoming call is transferred to the message center and the message is handled normally in block 88, and call processing of the present invention ends in block 90. If the action to perform 20 (FIG. 1) is not equal to proximity, as determined in decision block 78, the present invention determines whether the action to perform 20 (FIG. 1) is equal to transfer in decision block 82.

If the action to perform 20 (FIG. 1) is equal to transfer or not equal to transfer, the present invention determines whether an outgoing message override 24 (FIG. 1) is present in the selected CWPT row 28 (FIG. 1) in decision block 84. If an outgoing message override 24 (FIG. 1) is not present, the incoming call is transferred to the message center and the message is handled normally in block 88, and call processing of the present invention ends in block 90. If an outgoing message override 24 (FIG. 1) is present, as determined in decision block 84, the outgoing message is played to the incoming caller in block 86, the incoming call is transferred to the message center and the message is handled normally in block 88, and call processing of the present invention ends in block 90.

The administration processing functions of the present invention will now be discussed referring to FIGS. 3a, 3b, 3c, 3d, 3e, 3f and 3g. Specifically referring to FIG. 3a, the delineation between a typical phone message service 100 and the enhanced call waiting service 200 is shown by a dashed line. Moreover, the functions of a typical phone message service are identified with 100 series numerals, whereas the functions of the enhanced call waiting service are identified with 200 series numerals.

Administration processing begins in block 102 and typical password authentication is verified in block 104. Once password authentication has been successfully completed in block 104, the user is presented with the main administration menu in block 106. At decision block 108, if the user hangs up or exits, the administration processing ends in block 110. If at decision block 108, the user does not hang up or exit, the user's menu option selection is executed through decision blocks 202 and 112. One of the menu options will be enhanced call waiting. If at decision block 202, the user selects enhanced call waiting, the user is presented with an enhanced call waiting selection menu in block 204. If the user does not select enhanced call waiting, as determined in decision block 202, administration processing proceeds to decision block 112. At decision block 112, if the user selects some other valid menu option, the selected menu option is processed in block 114 and the user is returned to the main administration menu in block 106. If at decision block 112, the user does not select a valid menu option, the user is again presented with the main administration menu in block 106. This process is repeated until the user hangs up or exits, as determined in decision block 108, and administration processing ends in block 110.

Referring back to when the user selects enhanced call waiting in decision block 202 and is presented with an enhanced call waiting selection menu in block 204, the user may select various options such as quit, add, delete, change, activate/deactivate, browse, activate/deactivate default or may hang up. These options are indicated by decision blocks 206, 208, 218, 230, 240, 258, 276 and 284. If at decision block 206, the user selects quit, the user is returned to the main administration menu in block 106. If at decision block 206, the user does not select quit, administration processing proceeds to decision block 208.

Now referring to FIGS. 3a and 3b, if the user selects add, as determined in decision block 208, the user then specifies the new set identifier 12 (FIG. 1) in block 210. If the specified set identifier 12 (FIG. 1) is valid, as determined in decision block 212, the user then interfaces with the present invention to create a new CWPT row 28 (FIG. 1) in block 214, and is then returned back to the enhanced call waiting selection menu in 204. If the specified set identifier 12 (FIG. 1) is not valid, as determined in decision block 212, an error message is played to the user in block 216 and the user is returned to the enhanced call waiting selection menu in block 204. If at decision block 208, the user did not select add, administration processing proceeds to decision block 220.

Now referring to FIGS. 3a and 3c, if the user selects delete, as determined in decision block 218, the user specifies an existing set identifier 12 (FIG. 1) to be deleted in block 220. The present invention determines whether the specified set identifier 12 (FIG. 1) is valid in decision block 222. If the specified set identifier 12 (FIG. 1) is valid, the present invention will delete all CWPT rows 28 (FIG. 1) for the specified set identifier 12 (FIG. 1) in block 224, will play a message acknowledging the deletion in block 226, and will return the user to the enhanced call waiting selection menu in block 204. If, however, the specified set identifier 12 (FIG. 1) is not valid, as determined in decision block 222, an error message is played to the user in block 228 and the user is returned to the enhanced call waiting selection menu in block 204. If at decision block 218, the user did not select delete, administration processing proceeds to decision block 230.

Now referring to FIGS. 3a and 3d, if the user selects change, as determined in decision block 230, the user specifies a set identifier 12 (FIG. 1) to be changed in block 232. The present invention determines whether the specified set identifier 12 (FIG. 1) is valid in decision block 234. If the specified set identifier 12 (FIG. 1) is valid, the present invention interfaces with the user to make the desired changes to the CWPT rows 28 (FIG. 1) for the specified set identifier 12 (FIG. 1) in block 236 and the user is returned to the enhanced call waiting selection menu in block 204. If the specified set identifier 12 (FIG. 1) is not valid, as determined at decision block 234, an error message is played to the user in block 238 and the user is returned to the enhanced call waiting selection menu in block 204. If at decision block 230, the user did not select change, administration processing proceeds to decision block 240.

Figure 3E:
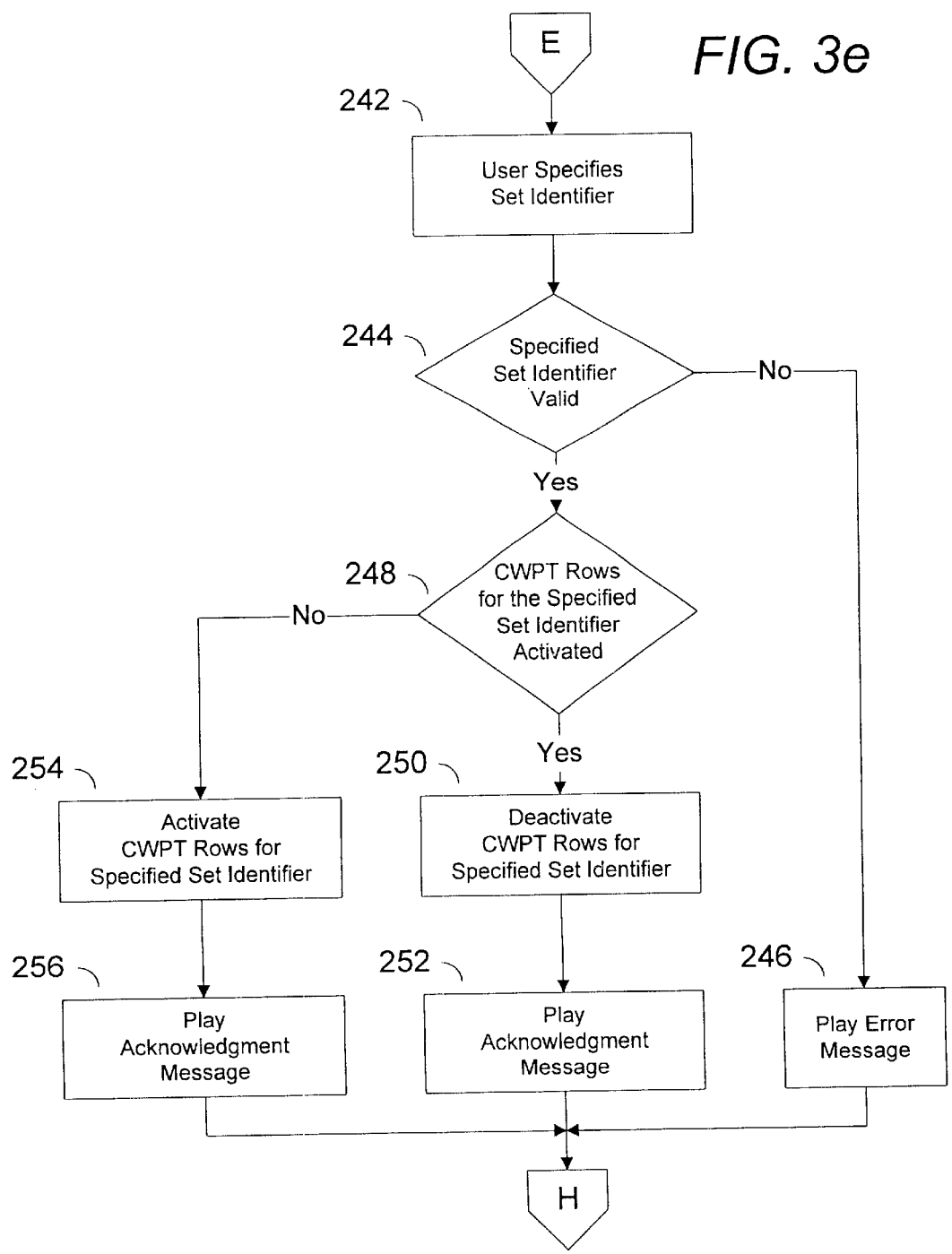

Now referring to FIGS. 3a and 3e, if the user selects activate/deactivate, as determined in decision block 240, the user specifies the set identifier 12 (FIG. 1) to be activated or deactivated in block 242. The present invention determines whether the specified set identifier 12 (FIG. 1) is valid in decision block 244. If the specified set identifier 12 (FIG. 1) is not valid, an error message is played to the user in block 246 and the user is again returned to the enhanced call waiting selection menu in block 204. If the specified set identifier 12 (FIG. 1) is valid, as determined in decision block 244, the present invention determines whether the CWPT rows 28 (FIG. 1) for the specified set identifier 12 (FIG. 1) have been activated by checking the row activation status 14 (FIG. 1) in decision block 248. If the CWPT rows (FIG. 1) for the specified set identifier 12 (FIG. 1) have been activated, the CWPT rows 28 (FIG. 1) are deactivated in block 250, an acknowledgment message is played to the user in block 252, and the user is returned to the enhanced call waiting selection menu in block 204. If, however, the CWPT rows (FIG. 1) for the specified set identifier 12 (FIG. 1) have not been activated, as determined in decision block 248, the CWPT rows 28 (FIG. 1) for the specified set identifier 12 (FIG. 1) are activated in block 254, an acknowledgment message is played to the user in block 256, and the user is returned to the enhanced call waiting selection menu in block 204. If at decision block 240 the user did not select activate/deactivate, administration processing proceeds to decision block 258.

Figure 3F:
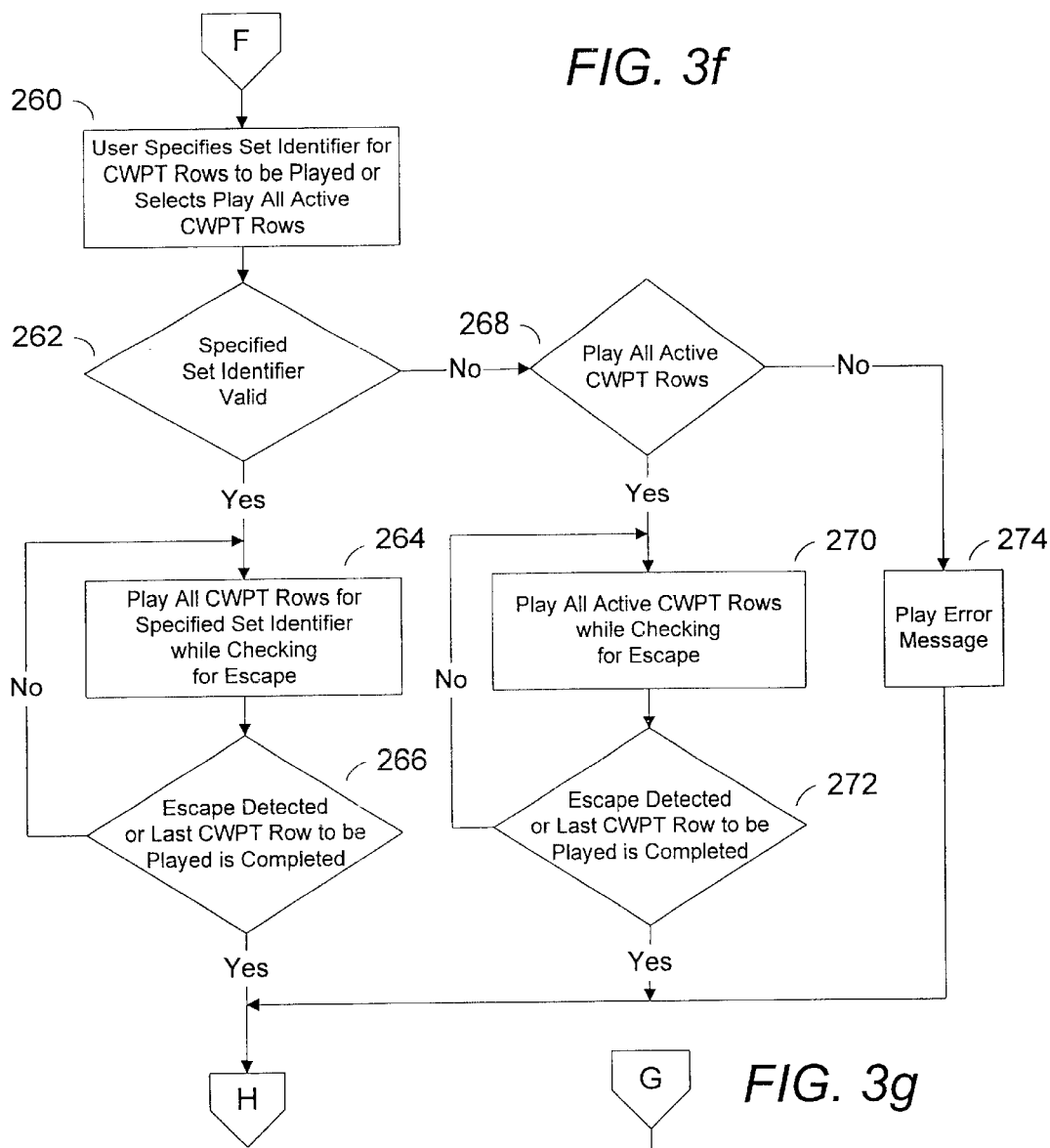

Now referring to FIGS. 3a and 3f, if the user selects browse, as determined in decision block 258, the user then specifies the set identifier 12 (FIG. 1) to be browsed or specifies that all active CWPT rows 28 (FIG. 1) are to be browsed in block 260. The present invention determines whether the specified set identifier 12 (FIG. 1) is valid in decision block 262. If the specified set identifier 12 (FIG. 1) is valid, the program plays all CWPT rows 28 (FIG. 1) for the specified set identifier 12 (FIG. 1) while concurrently checking for an escape code in block 264. While the present invention is playing the CWPT rows 28 (FIG. 1), it concurrently checks for an escape code entered by the user or for the completion of the last row to be played as determined in decision block 266. If an escape code is detected or the last row to be played is completed, the user is again presented with the enhanced call waiting selection menu in block 204.

If an escape code is not detected and the last row to be played is not completed, as determined in decision block 266, the program continues to play all CWPT rows 28 (FIG. 1) for the specified set identifier 12 (FIG. 1) in block 264 while continuing to check for an escape code or the completion of the last row to be played. If the specified set identifier 12 (FIG. 1) is not valid, as determined in decision block 262, the present invention determines whether the user selected that only active CWPT rows 28 (FIG. 1) are to be browsed in decision block 268. If only active CWPT rows 28 (FIG. 1) are to be browsed, the present invention plays the currently active CWPT rows 28 (FIG. 1) while concurrently checking for an escape code in block 270. While the present invention is playing the active CWPT rows 28 (FIG. 1), it concurrently checks for an escape code entered by the user or for the completion of the last row to be played as determined in decision block 272. If an escape code is detected or the last row to be played is completed, as determined in decision block 272, the user is again presented with the enhanced call waiting selection menu in block 204. If an escape code is not detected and the last row to be played is not completed, as determined in decision block 272, the program continues to play all active CWPT rows 28 (FIG. 1) in block 270 while continuing to check for an escape code or the completion of the last row to be played. If the active CWPT rows 28 (FIG. 1) are not to be browsed, as determined in decision block 268, an error message is played to the user in block 274 and the user is returned to the enhanced call waiting selection menu at block 204. If at decision block 258, the user did not select browse, administration processing proceeds to decision block 276.

Figure 3G:
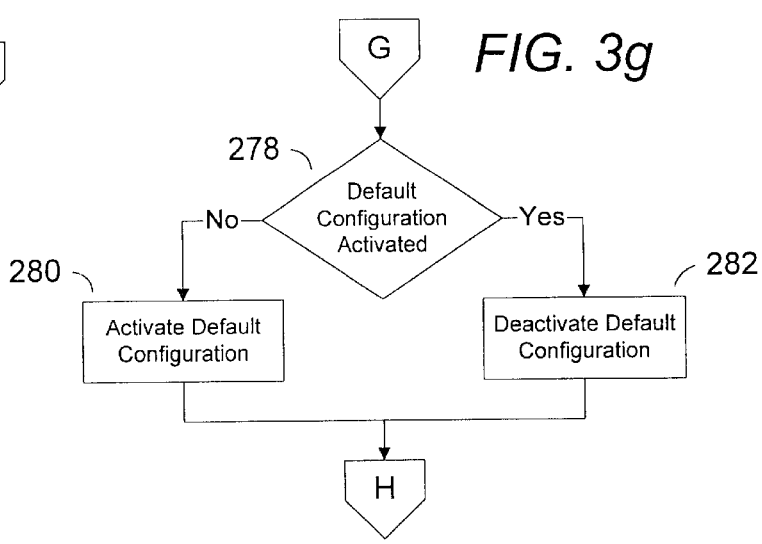

Now referring to FIGS. 3a and 3g, if the user selects activate/deactivate default, as determined in decision block 276, the present invention determines whether the default configuration, which handles all incoming calls with call waiting when the destination number is busy, has been activated in decision block 278. If the default configuration has not been activated, the present invention activates the default configuration in block 280 and returns the user to the enhanced call waiting selection menu in block 204. If, however, the default configuration has been activated, as determined in decision block 278, the present invention deactivates the default configuration in block 282 and returns the user to the enhanced call waiting selection menu in block 204.

Now referring only to FIG. 3a, at decision block 276, if the user has not selected activate/deactivate default, administration processing proceeds to decision block 284. If the user hangs up, as determined in decision block 284, administrative processing of the present invention ends in block 286. If the user does not hang up, as determined in decision block 284, the user is returned to the enhanced call waiting selection menu in block 204. This process continues until the user either hangs up or exits from the system.

Although preferred embodiments of the invention have been described in detailed, it will be understood by those skills in the art that various modifications can be made therein without departing from the spirit and scope of the invention as set forth in the appended claims.

What is claimed is:

1. A method of handling an incoming telephone call, comprising:

receiving a request for completing the incoming telephone call to a destination number, the request being associated with one or more parameters, at least one of the one or more parameters being a date or time parameter;

determining whether the destination number is busy;

whenever the destination number is busy, handling the incoming telephone call based on a set of user preferences, the set of user preferences being selected based on the one or more parameters;

whenever the destination number is not busy, completing the telephone call to the destination number; and when no set of user preferences corresponds to the one or more parameters, handling the incoming telephone call with call waiting.

2. The method as claimed in claim 1, wherein the step of handling the incoming telephone call based on the set of user preferences includes the steps of:

determining whether the incoming telephone call based on the set of user preferences, is to be handled with call waiting or is to be transferred;

whenever the incoming telephone call is to be handled with call waiting, handling the incoming telephone call with call waiting; and whenever the incoming telephone call is to be transferred, transferring the incoming telephone call to a message center.

3. A method of handling an incoming telephone call, which comprises the steps of:

receiving a request for completing the incoming telephone call to a destination number;

determining whether the destination number is busy;

whenever the destination number is not busy, completing the telephone call to the destination number; and whenever the destination number is busy, determining whether the incoming telephone call corresponds to at least one parameter contained in at least one set of user preferences, whenever the incoming telephone call does not correspond to at least one parameter contained in at least one set of user preferences, handling the incoming telephone call with call waiting, whenever the incoming telephone call corresponds to at least one parameter contained in at least one set of user preferences, selecting the set of user preferences that best corresponds to the incoming telephone call, determining whether the incoming telephone call, based on the selected set of user preferences, is to be handled with call waiting or is to be transferred, whenever the incoming telephone call is to be handled with call waiting, handling the incoming telephone call with call waiting, and whenever the incoming telephone call is to be transferred, transferring the incoming telephone call to a message center.

4. The method as claimed in claim 3, wherein at least one parameter contained in at least one set of user preferences corresponds to whether the set of user preferences has been activated.

5. The method as claimed in claim 3, wherein at least one parameter contained in at least one set of user preferences corresponds to when the request for completing the incoming telephone call is received.

6. The method as claimed in claim 3, wherein at least one parameter contained in at least one set of user preferences corresponds to where the incoming telephone call originated.

7. The method as claimed in claim 3, wherein each set of user preferences comprises:

a set identifier;

a first parameter indicating whether the set of user preferences has been activated;

a second parameter identifying at least one incoming telephone call source for which the set of user preferences is to be used;

a third parameter identifying at least one time period for which the set of user preferences is to be used; and a first instruction specifying how the incoming telephone call is to be handled.

8. The method as claimed in claim 7, wherein the second parameter is a telephone number containing wild card characters.

9. The method as claimed in claim 7, wherein the second parameter is based on a comparison of an incoming telephone number with the destination number.

10. The method as claimed in claim 7, wherein the first instruction is priority, proximity, or transfer.

11. The method as claimed in claim 7, wherein each set of user preferences further comprises:

a second instruction specifying a tone that is to be used when the incoming telephone call is handled with call waiting;

a third instruction specifying a message that is to be used when the incoming telephone call is transferred to the message center; and a pass code for overriding the first instruction.

12. The method as claimed in claim 3, wherein the step of determining whether the incoming telephone call corresponds to at least one parameter contained in at least one set of user preferences includes the steps of:

determining whether a default set of user preferences has been activated;

whenever the default set of user preferences has been activated, handling the incoming telephone call with call waiting; and whenever the default set of user preferences has not been activated, determining whether the incoming telephone call corresponds to at least one parameter specified in at least one set of user preferences.

13. The method as claimed in claim 3, wherein the step of selecting the set of user preferences that best corresponds to the incoming telephone call includes the steps of:

determining whether at least one set of user preferences contains a specified telephone number, which may contain wild card characters, that matches an incoming telephone number associated with the incoming call;

whenever at least one set of user preferences contains the specified telephone number that matches the incoming telephone number, selecting the set of user preferences that contains the specified telephone number and best corresponds to the incoming telephone call; and whenever at least one set of user preferences does not contain the specified telephone number or the specified telephone number does not match the incoming telephone number, classifying the incoming telephone call by comparing the incoming telephone number with the destination number, and selecting the set of user preferences that best corresponds to the classification of the incoming telephone call.

14. The method as claimed in claim 3, wherein the step of determining whether the incoming telephone call, based on the selected set of user preferences, is to be handled with call waiting or is to be transferred includes the steps of:

determining whether a pass code is present in the selected set of user preferences;

whenever a pass code is present in the selected set of user preferences, prompting a caller of the incoming telephone call to enter a password;

determining whether the pass code matches the password;

whenever the pass code matches the password, handling the incoming telephone call with call waiting using a special tone indicating that the caller has correctly entered the password; and whenever the pass code does not match the password, determining whether the incoming telephone call, based on the selected set of user preferences, is to be handled with call waiting or is to be transferred.

15. The method as claimed in claim 3, wherein the step of handling the incoming telephone call with call waiting includes the steps of:

determining whether a second instruction specifying a tone that is to be used when the incoming telephone call is handled using call waiting is present in the selected set of user preferences;

whenever the second instruction is present in the selected set of user preferences, handling the incoming telephone call with call waiting using the tone specified by the second instruction; and whenever the second instruction is not present in the selected set of user preferences, handling the incoming telephone call with call waiting using a default tone.

16. The method as claimed in claim 3, wherein the step of transferring the incoming telephone call to the message center includes the steps of:

determining whether a third instruction specifying a message that is to be used when the incoming telephone call is transferred to the message center is present in the selected set of user preferences;

whenever the third instruction is present in the selected set of user preferences, playing the message specified by the third instruction; and transferring the telephone call to the message center.

17. The method as claimed in claim 3, wherein the step of determining whether the incoming telephone call, based on the selected set of user preferences, is to be handled with call waiting or is to be transferred includes the steps of:

determining whether a first instruction contained in the selected set of user preferences is priority, proximity or transfer;

whenever the first instruction is priority, the incoming telephone call is to be handled with call waiting;

whenever the first instruction is transfer, the incoming telephone call is to be transferred; and whenever the first instruction is proximity, determining whether the incoming telephone is closer than a currently connected call to the destination number, whenever the incoming telephone call is closer than the currently connected call to the destination number, the incoming telephone call is to be transferred, and whenever the incoming telephone call is not closer than the currently connected call to the destination number, the incoming call is to be handled with call waiting.

18. A system for handling an incoming telephone call, comprising:

means for receiving a request for completing the incoming telephone call to a destination number, the request being associated with one or more parameters, at least one of the one or more parameters being a date or time parameter;

means for determining whether the destination number is busy;

means for determining a set of user preferences based on the one or more parameters;

means for handling the incoming telephone call based on the set of user preferences whenever the destination number is busy;

means for completing the telephone call to the destination number whenever the destination number is not busy; and means for handling the incoming telephone call with call waiting when no set of user preferences corresponds to the one or more parameters.

19. The system as claimed in claim 18, wherein the means for handling the incoming telephone call based on the set of user preferences comprises:

means for determining whether the incoming telephone call, based on the set of user preferences, is to be handled with call waiting or is to be transferred;

means for handling the incoming telephone call with call waiting whenever the incoming telephone call is to be handled with call waiting; and means for transferring the incoming telephone call to a message center whenever the incoming telephone call is to be transferred.

20. A computer-readable medium containing a data structure, comprising:

an activation status field configured to store an indication of whether a particular set of user preferences pertaining to telephone call handling is currently active;

a source field configured to store information regarding a source of an incoming telephone call, the information comprising at least one of a complete telephone number, a partial telephone number, and one or more variables indicating local, metro, or long distance telephone calls; and a date/time field configured to store at least one of a date and time for which a particular set of user preferences is to be applied to an incoming telephone call.

21. The computer-readable medium of claim 20 wherein the data structure further comprises:

an action field configured to store an indication of whether a telephone call is to be handled with call waiting or transferred to a message center.

22. The computer-readable medium of claim 20 wherein the data structure further comprises:

a tone field configured to store an indication of a type of tone to be used for call waiting for a particular user preference;

a message override field configured to store a message to be played to a calling party when an incoming telephone call is transferred to a message center; and a pass code field configured to store a pass code that allows a caller to override a particular set of user preferences.

* * * * *